United States Patent [19]
Sartorio

[11] Patent Number: 4,728,771
[45] Date of Patent: Mar. 1, 1988

[54] AUTOMATIC CUTTING MACHINE USING LASER RAY

[75] Inventor: Franco Sartorio, Torino, Italy

[73] Assignee: Prima Industrie S.p.A., Italy

[21] Appl. No.: 753,277

[22] Filed: Jul. 9, 1985

[30] Foreign Application Priority Data

Jan. 3, 1978 [IT] Italy .................. 67410 A/78

[51] Int. Cl.$^4$ ............................ B23K 26/00
[52] U.S. Cl. ..................... 219/121 LN; 219/121 LG; 219/121 LS; 219/121 LU; 219/121 LV; 364/475
[58] Field of Search .............. 219/121 LG, 121 LL, 219/121 LN, 121 L, 121 LZ, 121 LS, 121 LT; 364/475, 193, 191, 171, 520

[56] References Cited

U.S. PATENT DOCUMENTS

| 3,506,779 | 4/1970 | Brown et al. | 219/121 LZ |
| 3,889,095 | 6/1975 | Egan | 219/121 LG |
| 4,469,930 | 9/1984 | Takahashi | 219/121 LG |
| 4,530,061 | 7/1985 | Henderson et al. | 219/121 LG |
| 4,629,858 | 12/1986 | Kyle | 219/121 LV |

FOREIGN PATENT DOCUMENTS

| 0077989 | 6/1980 | Japan | 219/121 LS |
| 0097892 | 7/1980 | Japan | 219/121 LG |
| 2120202 | 11/1983 | United Kingdom | 219/121 LG |

Primary Examiner—M. H. Paschall
Attorney, Agent, or Firm—Wigman & Cohen

[57] ABSTRACT

An automatic cutting machine including at least one mounting stand linearly movable in a first direction by a first driving structure; a powerful laser-beam generator; a head that sends out infrared ray flux generated in the laser-beam generator after the flux is condensed or focussed and a movable supporting structure for supporting the head above the mounting stand. The supporting means moves in the first direction and a second direction perpendicular to the first direction and a third direction perpendicular to both the first and second directions by means of a seocnd and third driving means. A connecting structure for rotating the supporting, structure around the first direction or axis by a fourth driving structure in order to rotate the head around the second direction or axis perpendicular to the first direction or axis relative to the connecting structure by means of a fifth driving structure and an automatic control means for the driving means and the laser-beam generator. A protective element for defining a cutting area in which the areas of the mounting stand is installed so as to move across the areas of the protective means being constructed by material nontransmissive to infrared ray flux.

14 Claims, 5 Drawing Figures

4,728,771

AUTOMATIC CUTTING MACHINE USING LASER RAY

FIELD OF THE INVENTION

This invention relates to an automatic cutting machine, using a Laser ray and, in particular an automatic cutting machine particularly suitable for cutting covering material for the interiors of vehicles, for example, of cars, and method of using the same.

It is well known to cover the interior of cars and industrial vehicles by covering materials which are of a hard or semi-hard type. Ordinarily the covering material is composed of a flexible plastic sheet on one or both sides to which textile fabric is applied.

In general, hard or semi-hard covering material is first cold-stamped or pressed on a mold so as to take a particular spatial space resembling the shape of the interior. The edge of the shaped covering material is then trimmed along a particular circumference of the material previously determined. If necessary, the edge-trimming work includes some processing of holes and/or windows of various shapes and sizes.

In the processing work for trimming or cutting off the edge or margin of the covering material, many problems occur because the periphery of the finished material extends spatially or three dimensionally and the lines defining the periphery extend along various directions.

DESCRIPTION OF THE RELATED ART

Conventionally, trimming or cutting-off edges of the covering material has been done by first stamping or molding the material and then corroding the outer periphery defined by the previous molding. The molding process for following cutting work requires great expense, and consequently the process cannot be adapted after starting of production. It is apparent that the above discussion is based on economical reasons. Furthermore, the conventional production process involves a necessarily subsequent corrosion process applied to the periphery of material after the covering is trimmed.

It is clear from the above, in a small quantity production system or in an early stage of a mass production system, the edge-trimming process and corrosion process of the covering material has been carried out by hand, resulting in a high-cost of production and irregularity in product quality.

OBJECTS AND SUMMARY OF THE PRESENT INVENTION

The object of the present invention is to provide an automatic cutting machine, in which covering material can be cut without corrosion process of peripheral edges thereof after manual cutting or trimming thereof.

The object above can be attained by provision of an automatic cutting machine, according to the present invention, comprising at least one mounting stand movable along a first line on direction under pressure of a first operation means, a powerful laser-beam generator, a head from which ultrared ray flux emits after it is generated in the laser-beam or power generator and condensed through a condenser, a supporting means for supporting the emitting head above the mounting stand, the supporting means being movable and able to move the head linearly along a second direction perpendicular to the first direction and a third direction perpendicular to the two directions mentioned above under operative forces of second and third operating means, a connecting means placed between the head and the supporting means, the connecting means being adapted to rotate around the center of the first direction or axis relative to the supporting means under operative force of a fourth operating means, the head being fixed to the connecting means so as to rotate around the second axis or direction perpendicular to the first axis rotatable to the connecting means under operative force of a fifth operating means, an automatic control means for the operating means and the laser-power generator, and a protective means for defining a cutting operation area across which the mounting stand being moved, the protective means being of an opaque character for ultra ray flux. Preferably, the automatic control means comprises a control computer for the laser beam or power generator and a measurement means connected to an input terminal of the computer. The measurement or teaching means is adapted to particularize and determine a focus point and proceeding direction of ultra red ray flux and to transfer coordinates of the particular periphery or profile of the material to be processed to the computer.

Other characteristics and merits of the present invention will be clear when the following description is read in view of the appendix drawings showing non-exclusively an embodiment of the present invention.

DETAILED DESCRIPTION OF THE INVENTION

Figure 1:
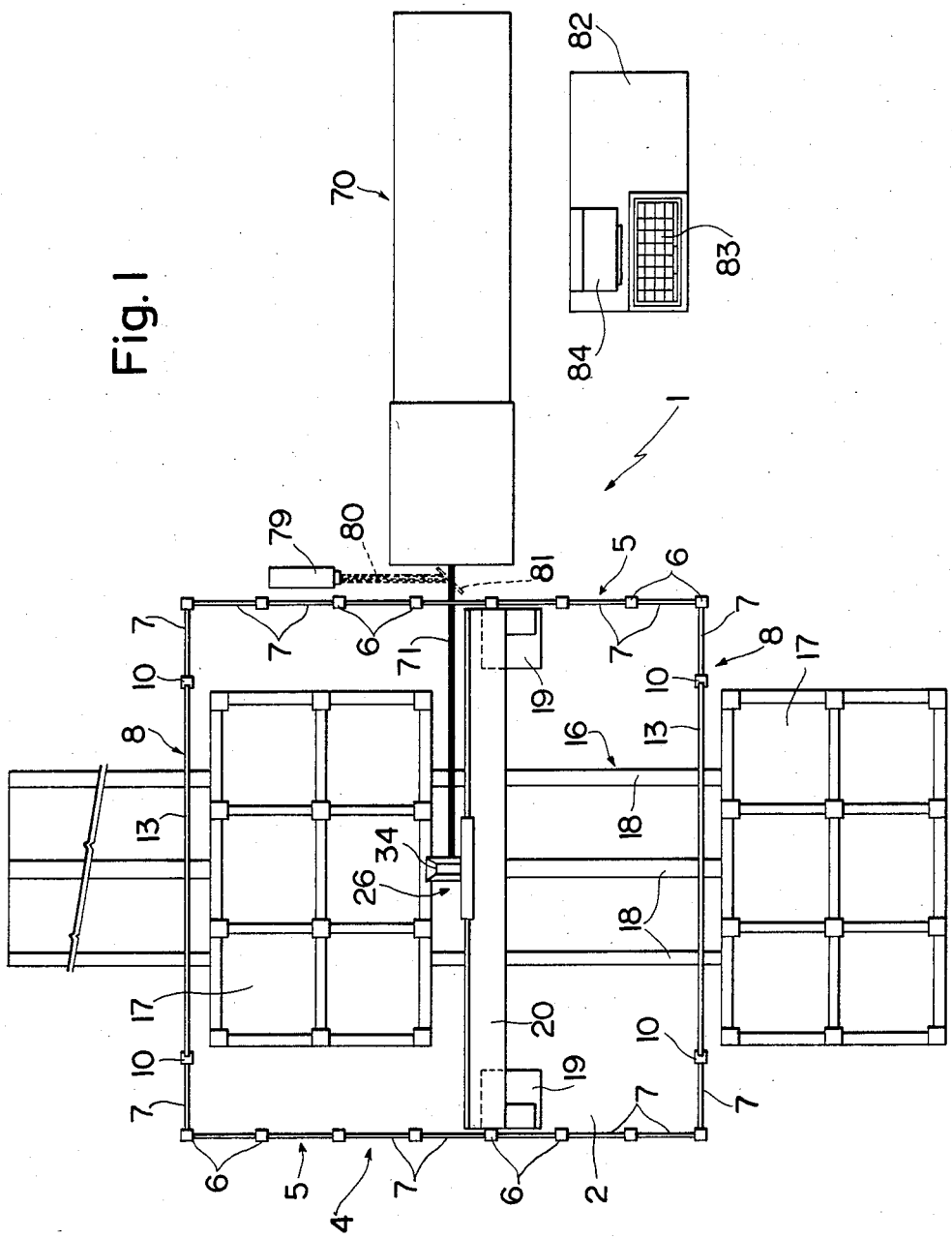
FIG. 1 is a schematic plan view of the automatic cutting machine embodied in accordance with the teaching of the present invention.
Figure 2:
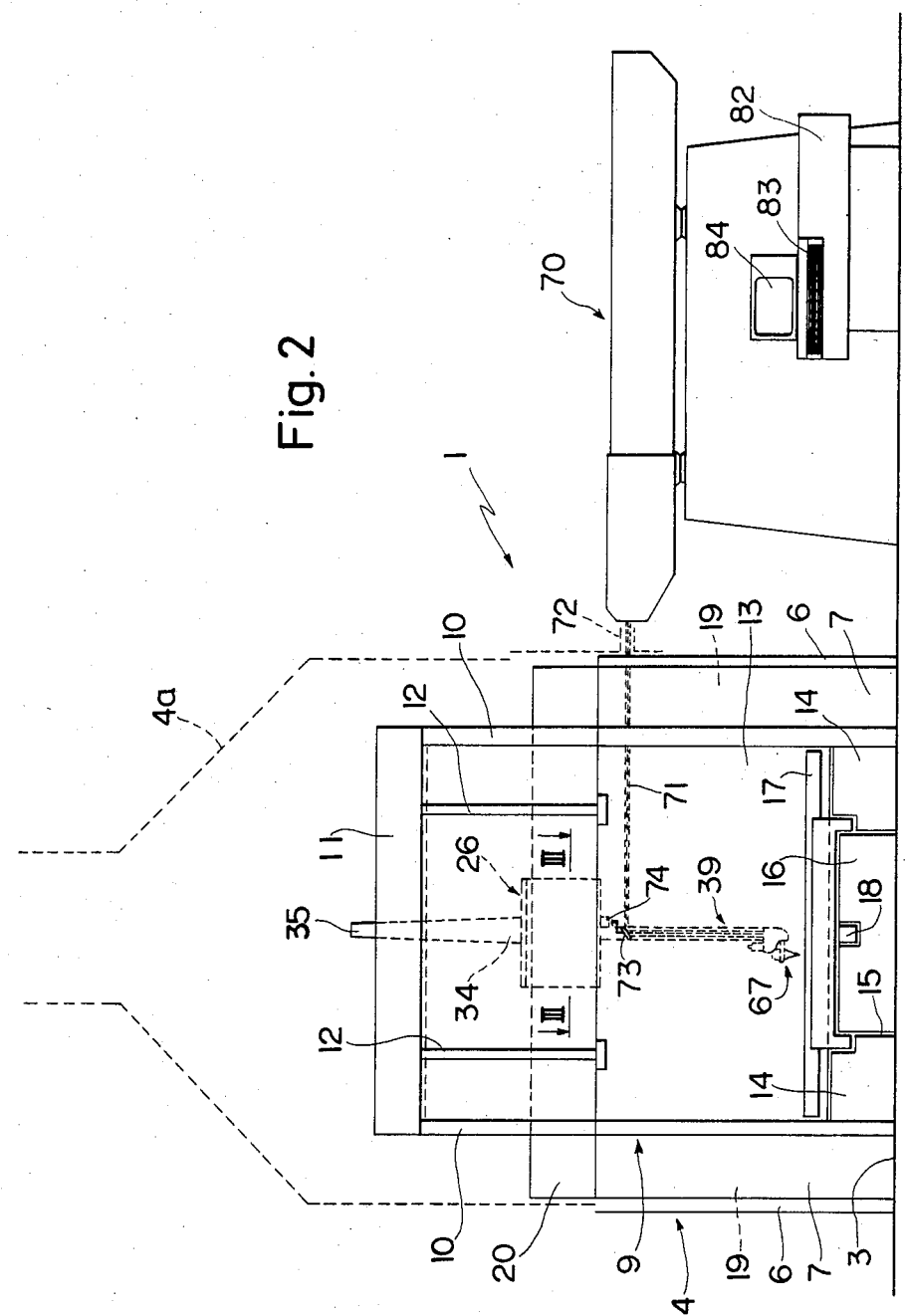
FIG. 2 shows a side view of the machine of FIG. 1.

FIGS. 1 and 2 of the accompanying drawings show an automatic cutting machine for cutting along a periphery of a particular cover material required-to-be-cut (not shown) for the interior of car. The cover material is of the type which in general includes hard or semi-hard plastic thin plate or sheet of flexibility having a surface or both surfaces covered by various fabrics. The flexible plastic plate has a shape of two or three-dimensions.

The automatic cutting machine of the present invention has a cutting operation area confined by a flat floor 3 at a bottom of the area (FIG. 2), a protective iron construction 4 having generally square sides , and a cover 4a at its top. Two confronting side walls 5 (FIG. 1) are respectively constructed by a plurality of pillars 6 erected upwardly on the floor 3 and perpendicular panels 7 of glass panes or generally thin plates non-transmission to infrared ray flux.

As shown in particular in FIG. 2, the cutting operation area 2 can be accessible through the confronting side walls 8 (FIG. 1) situated at other sides than these of the perpendicular panels 7 mentioned above, which side walls 8 are of the protective iron construction 4. That is, the perpendicular panels 7 are situated at both sides of the side walls 8 and two perpendicular pillars 10, which are higher than the pillars 6, are situated at the center of the perpendicular panels 7. At the center above, an entrance 9 is formed by the perpendicular pillars 10 and a horizontal beam 11 situated on the pillars 10 contacting with their top ends. An elevating apparatus 12 for elevating an elevating door 13 is operatively connected to the horizontal beam 11 and windows are slidably employed between the pillars 10. Lower ends of the windows cooperate, at their descended positions, with upper ends of two fixed panels 14 defining an opening 15. Benches 16 traverse the opening 15 and are supported on the floor 3.

The elevating door 13 and panels 14 are constructed or manufactured by material of non-transmissive to infrared ray flux. The benches 16 extend across the whole cutting operation area 2 and through the two openings 15 of the area 2. The benches 16 have two extreme ends extending enough in their length to support the mounting stands 17 situated outside of the area 2. Both the mounting stands 17 are generally square in shape and have their longitudinal axes perpendicular to those of the benches 16, and are respectively situated on the benches 16 so as to slide along the direction hereinafter being referred to as X-direction or axis X on a horizontal long guide 18 extending in parallel with the confronting side walls 5.

The operation of each mounting stand 17 situated in series on the benches 16 is preferably obtained by individual servo-mechanisms for each stand 17. The servo-mechanisms are not shown in the drawing.

Pillars 19, supporting a horizontal beam 20 which is perpendicular to the walls 5 through top ends of the pillars, are placed at the position adjacent to the central portion of each wall 5 and within the cutting operating area 2. The pillars 19 are identical with the pillars 6 in height.

Figure 3:
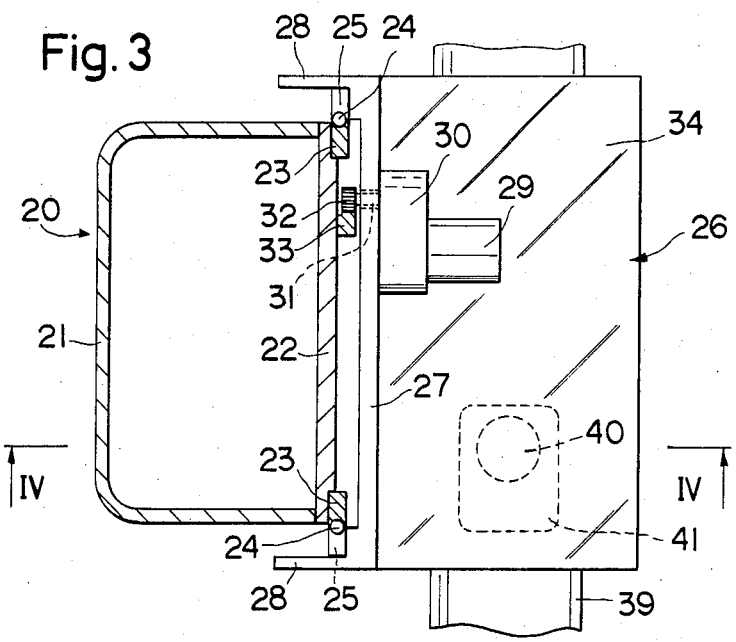
FIG. 3 is an enlarged sectional view along the line of III—III in FIG. 2.

As particularly shown in FIG. 3, the beam 20 is a metal-made box of C-shaped iron 21 having a side closed by a perpendicular plate 22. On outer face of the plate 22, there are two V-grooved guides 23. They are rigidly fixed to upper and lower edges of the plate and extend in the horizontal direction perpendicular to the walls 5, which direction hereinafter being referred to as Y-direction or axis Y. The V-grooved guides 23 respectively cooperate or engage with the corresponding V-grooved guides 25 through balls 24, which guides 25 are mounted on a carriage 26 which is slidably mounted to and along the beam 20.

It is noted that the carriage 26 is situated so as to confront the plate 22 and comprises a plate 27 supporting the guides 25. From the upper edge and lower edge, two plates 28 extend so as to be placed above and below the beam 20 and the plates 28 are equal to each other in length. A first servomotor 29 fixed to the plate 27 actuates, through a reduction gear 30 and an output shaft 31, a pinion 32 engaging with a rack 33 which is fixed to the plate 22 and extends along the plate 22 in parallel with the axis Y.

Figure 4:
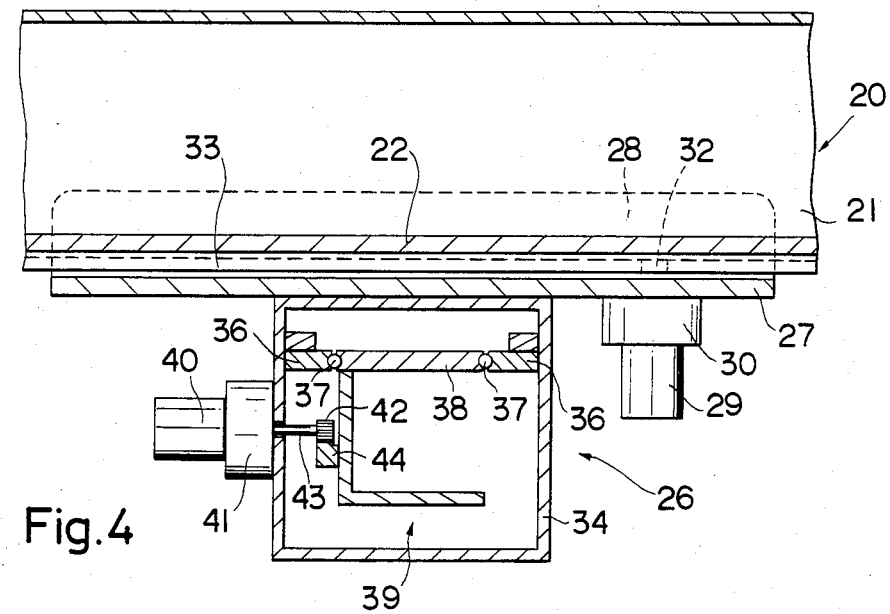
FIG. 4 is also an enlarged sectional view sectioned along the line IV—IV shown in FIG. 3.

It is apparent from FIG. 4 that a hollow sleeve 34 extends along the vertical direction and perpendicular to the axis Y, and it is rigidly fixed to a surface of the plate 27 opposite the plate 22. The hollow sleeve 34 extends beyond the beam 20 and is closed at its top end by a tumbler-like elongated cap 35 (FIG. 2).

The hollow sleeve 34 is of a parallelogram in section and two V-grooved guides 36, extending in the direction which hereinafter being referred to as Z-direction or axis Z, are fixed to an inner surface of two side walls 34 of the hollow sleeve 34, the side walls extending perpendicularly to the plate 27. The guides 36 cooperatively engage with V-grooved guides, through balls situated between guides, formed on both ends or edges of a long plate 38 extending along its longitudinal axis in parallel with the axis Z. The pillar 39 has a generally C-shaped section and the long plate 38 forms one of three side walls. An open side of the C-shaped pillar 39 faces the wall 5 of the iron construction 4.

FIG. 4 shows the pillar 39 adapted to move along the axis Z by a servomotor 40. That is, the servomotor 40 rotates an output shaft 43 through a reduction gear 41, the output shaft 43 rotates a pinion 42 keyed to the shaft 43, and the pinion 42 engages with a rack 44 fixed to the column 39. The output shaft 43 extends in parallel with the Z axis.

Figure 5:
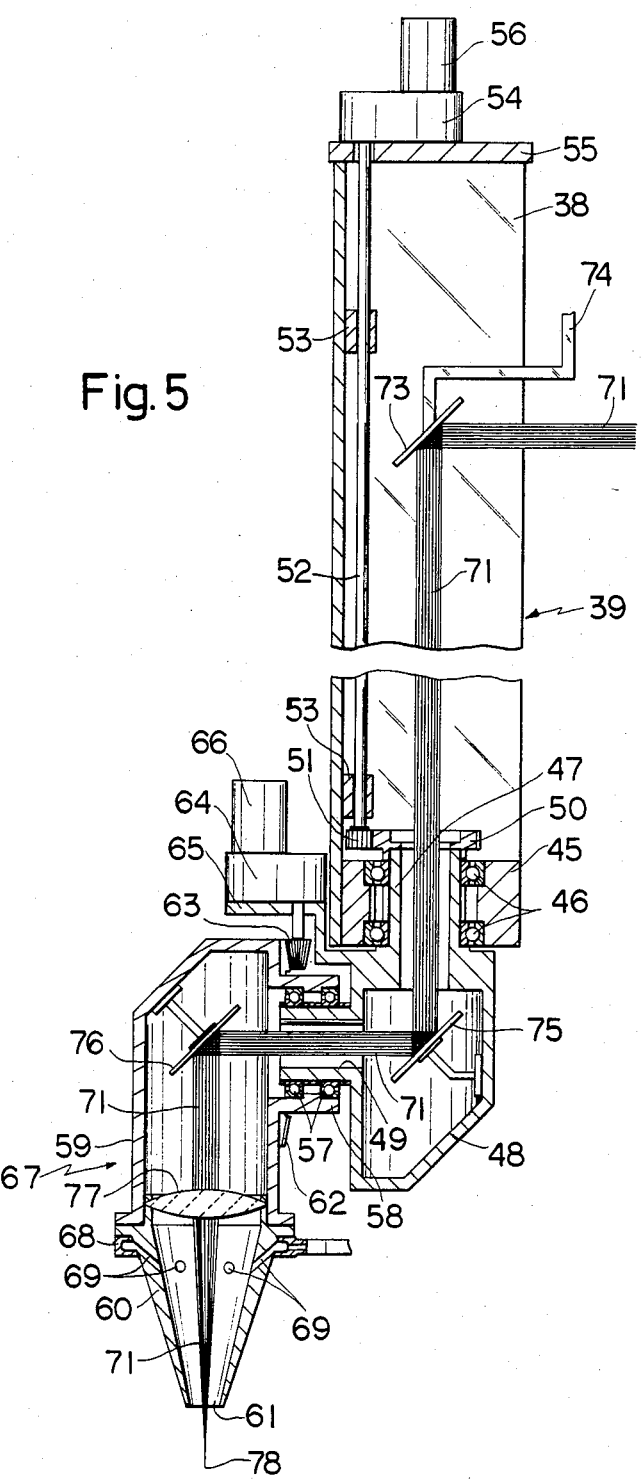
FIG. 5 is an enlarged longitudinal sectional view of a part of FIG. 2.

As shown in FIG. 5, a ring 45 is fixed to the bottom end of the column 39 and a cylindrical extension 47 of a box-like member 48 is rotatably inserted into the interior of the ring 45 through a bearing 46. A second cylindrical extension 49 is provided on the box-like member 48 so as to extend in a direction perpendicular to a longitudinal axis of the cylindrical extension 47. On a free end of the cylindrical extension 47, which end extends out of the ring 45 into the interior of the column 39, there is a gear 50 placed along the axis Z. The gear 50 engages with a pinion 51 keyed to a shaft 52 extending, in the interior of the column 39 substantially through the whole length of the column in parallel with the axis Z and being rotatably supported by means of supporters 53. The shaft 52 is connected to an output side of a reduction gear 54 supported on a horizontal plate 55 at a top end of the column 39 and operated by a servomotor 56.

The cylindrical extension 49 is rotatably connected to another cylindrical extension 58, by means of a bearing 57, extending from a cylindrical member 59 along its radial direction. The cylindrical member 59 has a closed end and another flanged end, to which flanged end a large bottom end of a truncated member 60 is connected. At a small bottom end of the truncated member 60, an opening 61 is formed. A bevel gear 62 is fixedly keyed to the cylindrical extension 58, which gear engages with a beveled pinion 63, and the pinion 63 is fixedly keyed to an output shaft of a reduction gear 64 driven by a servomotor 66 which is supported by an arm member 65 integrally formed on the box-like member 48.

The cylindrical member 59 and the truncated member 60 constitute a head 67 which is adapted to be placed over the bench 16 and the head 67 rotates with the box-like member 48 around the axis Z and rotates relative to the box-like member 48 around an axis perpendicular to the axis Z. The head 67 angularly moves, by a force of the servomotor 56, and the angular movement is hereinafter referred to as a movement A, which movement has its largest angle of 360°. While the other angular movement, which is hereinafter referred to as a movement B, of the head 67 relative to the box-like member 48 by a force of the servomotor 66 has its largest angle of 180° around a central axis, in parallel to the axis Z, of the head 67. A collar 68 is fixed to the cylindrical member 60 and the collar 68 communicates with a supply conduit and openings 69 formed through a wall of the cylindrical member 60. By means of the supply conduit and openings 60, nitrogen can be supplied into the interior of the cylindrical member 60 and is discharged through the openings 61.

The machine 1 includes a laser-power generator, which is shown generally by a reference numeral 70, placed out of the cutting-operating area 2 so as to confront the side walls 5 of the iron construction 4 and the open side of the column 39 faces the laser-power generator 70. The generator 70 is of the type of rapid flowing $CO_2$ and has a shutter (not shown) of magnetic operative type. The generator 70 emits invisible infrared ray flux 71. The flux enters into an interior of the cutting-operation area 2 through a protective guide pipe 72 (FIG. 2) formed integrally in a cover 4a and an opening (not shown) formed so as to penetrate through the side wall 5 at the level just below the beam 20. The flux then is transmitted to the interior of the column 39 through the open side of the column.

As clearly shown in FIG. 5, in the interior of the column 39 and the head 67, there is an optical system comprising a first mirror 73 supported by the carriage 26 through a supporting fixture 74, a second mirror 75 supported in the cylindrical member 48, and a third mirror 76 and a condenser lens 77 respectively supported in the cylindrical member 59.

All mirrors 73, 75 and 76 are placed so as to make an angle of 45° relative to the axis Z and the second mirror 75 faces upwardly and the mirrors 73 and 76 face downwardly. In particular, the mirror 73 is placed at the crossing of axis of the guide pipe 72 and the cylindrical extension 47, the mirror 75 at the crossing of axis of the cylindrical extensions 47 and 49, and the mirror 76 at the crossing of the cylindrical extension 49 and the truncated member 60. Owing to the optical system having the set of mirrors respectively firmly fixed at their positions, the flux 71 emitted from the generator 70 and entered in the column 39 advances vertically along the longitudinal axis of the column 39 and through the cylindrical extension 47, then horizontally through the cylindrical extension 49 into the interior of the head 67, and last, along the head 67, through the lens 77. The lens 77 is placed as shown so as to be perpendicular to the longitudinal axis of the head 67 and so as to focus the flux 71 on a point 78 substantially placed at the imaginary summit of the truncated member 60.

There is a second laser-power generator 79 for teaching or measurement out of the iron construction 4, which generator emits laser flux 80 which is reflected on a portable mirror 81 and faces to the mirror 73 after passing through the guide pipe 72.

The machine 1 is generally manually operated and is taught a particular shape of sample on the mounting stand 17 placed in the cutting-operation area 2 for afterward trimming a cover material following the particular shape on the mounting stand 17.

In a programming, the main generator 70 is stopped in operation and the subsidiary generator 79 is operated for teaching or measurement. The ray flux 80 emitted from the subsidiary generator 79 is reflected on the portable mirror 81 advancing toward the mirror 73, through the column 39 and being sent to the condenser lens 77 by means of the mirrors 75 and 76. It is apparent that the condenser lens 77 focuses the infrared rays on the point 78 which is also called a cutting point.

The operator of this automatic cutting machine according to the present invention operates a control servomotor for the mounting stand 17, which control servomotor is controlled so as to determine preferably positions and operating speeds of the stand by means of one closed operating system and other control servomotors 29, 40, 56 and 66 for the optical system consisting of the set of mirrors 73, 75 and 76 and the condenser lens 77. The operation above of the servomotors is carried out by a manual control board (not shown). In the teaching operation, the head 67 is moved linearly along the whole periphery of the sample placed on the mounting stand 17 or the directions of X, Y and Z shown in the drawing and angularly along the movements A and B. When the point 78 coincides with the particular points on the periphery of the sample, which points are determined at will, the operator sends a set of signals concerning or indicating the five coordinates of the head 67 to memories of the control computer 82. When the teaching or profiling operation of the sample is over, the memory of the control computer 82 memorizes data enough in number for controlling various servomotors so as to make the machine 1 repeat the cycle taught by hand thereto. As to the programming, the control computer 82 has a key board 83 and a display 84. Operation of the key board 83 omits, adds or modifies a part of the cutting course programmed in the program for the machine or any instructions concerning the cutting speed of the point 78 at the particular points on the cutting course and to the ratio between the cutting speed and the capacity of the laser-power generator 70 may be inserted in the program.

Concerning a data reading system for the teaching or measurement laser-power generator 79, it is noted that the subsidiary generator 79 can be omitted by employing another measurement device of any kind, such as an electronic probe (not shown) which is applied to the cylindrical member 59 after the truncated member 60 is removed from the cylindrical member.

In advance of the cutting operation for the rear cover material, one or several operators place a material to be cut on the mounting stand 17 situated out of the operating, working area 2. In accordance with instructions issued from the control computer 82, the door 13 facing to the mounting stand 17 is raised and the mounting stand 17 is moved into the area 2 along the bench 16. When the stand 17 is within the area 2, and the door 13 is downed and the area is closed in order to prevent the area from being exposed from the outside without interposing any protective material which is non-transmissive to infrared ray between the area and the outside of the area. Closing the area preferably makes smoke generated during the cutting operation in the area discharge from the area through an open top of the cover 4a.

The whole machine 1 including the laser-power generator 70 is controlled in the cutting operation by the computer 82, which computer recognizes the cutting route interpolated in the coordinates of the particular points and memorized in the memory thereof and leads the laser ray along the desired course with a desired angular movement and the maximum cutting speed. When the cutting speed of the laser lowers, the intensity of laser is controlled and lowered.

In cutting, nitrogen is led into the truncated member 60 through a collar 68, so that cutting is done within a neutral atmosphere without flame, and smoke generated by cutting is prevented from entering into the truncated member 60 through the opening 61 at the bottom of the member. Consequently the lens 77 doesn't become smoked up, not making it opaque.

After the completion of the cutting operation, the door 13 corresponding to the particular mounting stand 17 is opened or raised and the mounting stand 17 is moved out of the operating area 2 and immediately the door 13 is shut. Then the material cut on the stand 17 is removed from the stand and a new material to be cut is loaded on the stand. During the operation of unloading and loading of the material placed on the mounting stand, another material loaded on another stand in the interior of the iron construction 4 is being cut, which other stand had been carried into the interior after the previous one is removed out of the area.

It is apparent that it is possible to load various materials to be cut having different shapes and sizes on the plural mounting stands 17 and sequentially trim or cut edges of them in accordance with the program previously determined.

It is preferable from a safety viewpoint and productivity standpoint to project or extend the benches 16 from the iron construction 4 enough in length for mounting the stand 17. Practically, the mounting stand 17 is placed in the operation time of loading and unloading completely out of the iron construction 4, so as to close the door 13 corresponding to the particular stand 17, resulting in that the operator can be perfectly protected from laser rays. The mounting stand 17 placed in the unloading and loading position is accessible from three sides of the stand by the operator, so that any work to be carried to the stand can be done very easy.

In the embodiment mentioned above, one bench 16 holds guidably two mounting stands 17 arranged in series and each respective stand of the tandem set of stands is moved by an independent servomotor (not shown). Apparently, it is possible to employ some systems. According to one system, two mounting stands 17 are mutually connected and they are driven by a single servomotor, the second system uses two mounting stands 17 positioned in a parallel relationship and placed on a set of benches parallely arranged, the third system has only one mounting stand 17, and the fourth system combining any of the above-mentioned systems in a various manners. However, the embodiment shown in the accompanying drawings is considered as a best one. In fact, employing a single mounting stand 17 inevitably leads to an extreme increase of the idle time period of the cutting machine. When two mounting stands 17 arranged in parallel are used, a door 13 exceedingly increased in length more than that shown in the drawing is necessary so that it is very difficult to handle the large door. Consequently, the building for housing the cutting machine and its accesories must be made large and access to mounting stands 17 is made inconvenient. When a single servomotor is used to simultaneously move two mounting stands 17, the flexibility of the cutting machine is lowered and the idling time period thereof is increased. Practically, in case that single servomotor is used to for two stands, it is necessary to thoroughly stop the machine when any trouble occurs on one of the mounting stands during the cutting operation or the loading and unloading operation. It is possible to make the open time period shortest if two mounting stands are used and individually operable because only one of the doors is sufficient to be open. In order to make the operation safe, a magnet shutter (not shown) of the main laser-power generator 70 is closed when the door is open.

When the above-mentioned cutting machine using two mounting stands 17 arranged in series is compared with another machine using two stands 17 arranged in parallel, it is apparent that the latter machine can use only one place in which materials are loaded and unloaded and which is positioned at one side of the building and the former machine necessitates two places in which materials are loaded and unloaded. It seems that the former system has demerits, however the former system is better than the latter in efficiency. In practice, it is unreasonable to reform the cutting machine so as to be able to cut the equivalent materials on both two mounting stands 17. Accordingly it is very advantageous, in view of supplying materials, to separate the place in which loading and unloading of materials are carried out for a plurality of mounting stands 17 into two places.

Last, concerning the position of the main laser-power generator 70 respective to the column 39, shape of the column 39, and a reflection system for ray flux 71, the generator 70 may be placed so as to pass through an opening horizontally pierced at the top of the cap 35 and the mirror 73 may be fixed at the place confronting the horizontal opening formed at the top of cap 35. In this case, the column 39 is so formed as not to open a side of its section and the plate 55 to have an opening through which ray flux 71 passes.

In point of mechanical precision of the cutting machine, it is preferable to use the column constructed by a closed box-like structure. In general, in spite of the fact mentioned above, it is recommended that the construction of the cutting machine as shown in the drawing according to the present invention, because the distance between the mirrors 73 and 75 is shorten and as a result the trouble owing to imperfect parallelism or alignment of them generated contingently is decreased (it is reduced at least by half).

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. An automatic cutting machine comprising:
   at least one mounting stand linearly movable in a first direction by a first driving means;
   a main, cutting laser-beam generator;
   a head sending out infrared ray flux generated in the main laser-beam generator after the flux is condensed or focussed;
   movable supporting means for supporting the head above the mounting stand, said supporting means moving in the first direction and a second direction perpendicular to the first direction and a third direction perpendicular to both the first and second directions by means of a second and third driving means;
   connecting means for rotating said supporting means around the first direction or axis by a fourth driving means in order to rotate the head around the second direction or axis perpendicular to the first direction or axis relative to the connecting means by means of a fifth driving means;
   automatic control means for the driving means and the laser-beam generator and a measurement means connected to an input of a computer, the measurement means being adapted to determine a focus point and the direction of infrared ray flux and to transfer the coordinate of the particular periphery of the material to be processed, and the measurement means including a visible noncutting laser-beam generator able to send visible ray flux to the head, wherein said visible noncutting laser-beam is adapted to transmit a second tracing laser-beam through said head in coaxial positional relationship to the cutting laserbeam; and protective means for defining a cutting area in which area said mounting stand is installed so as to move across the area, said protective means being constructed by material non-transmissive to infrared ray flux.

2. The automatic cutting machine according to claim 1, wherein said driving means includes servomotors their positons and speeds are controlled by a closed operative system.

3. The automatic cutting machine according to claim 1, wherein said supporting means for the head, which supporting means is placed above the mounting stand and includes a first guide means extending along the second direction across the mounting stand, a carriage adapted to move along the first guide means, a second guide means attached to the carriage so as to extend along the vertical third direction, and a vertical column attached to the carriage along the second guide means, the infrared ray flux emitted from the main laser-beam generator passes from an outlet of the generator along a linear route in parallel to the first guide means, said column is placed on the route and having a turning means for turning the ray flux in downward vertical direction.

4. The automatic cutting machine according to claim 3, wherein said linear route extends below the first guide means and said column has a concave portion in section, an opening of the concave portion is faced to said main laser-beam generator and infrared ray flux passes the opening, said turning means is slanted 45° relative to the linear route and has a mirror fixed at a place fixed to the carriage inside of the column.

5. The automatic cutting machine according to claim 4, wherein said connecting means comprises a cylindrical body provided with two cylindrical extrusions extending perpendicular to each other and being arranged on an axis coinciding with said first and second axes, said first cylindrical extrusion is rotatably fixed at a bottom end of the column, said second cylindrical extrusion is rotatably fixed on the head, and an axis of the head is perpendicular to said second extrusion.

6. The automatic cutting machine according to claim 5, wherein a condenser lens for focusing is mounted in the head so as to make both the beam axis of the lens and the longitudinal axis of the head parallel to each other, a second mirror is placed at the crossing, in the head, of an axis of the head and an axis of the second cylindrical extrusion, a third mirror is situated at the crossing of, in the cylindrical space, the axis of both the cylindrical bodies, said first mirror reflects the ray flux from the laser-power generator along the column directing toward the third mirror through said first cylindrical extrusion and the third mirror reflects the ray flux directing toward the second mirror through the second cylindrical extrusion.

7. The automatic cutting machine according to claim 6, wherein the head is provided with a truncated end portion having an axial opening through which focussed ray flux passes and emits and a gas supply means for supplying non-active gas to the truncated end portion.

8. The automatic cutting machine according to claim 1, wherein said protective means includes an iron construction for defining an operating area, a top cap for sucking out smoke generated in cutting operation, and a side wall constructed by vertical panels of the material non-transmissive to ray flux emitted from the powerful laser-beam generator.

9. The automatic cutting machine according to claim 8, wherein benches extend across the operating area, there is a guide on the benches in parallel with the first direction, two mounting stands are fixed in series on the benches which extend through openings formed in the opposite side panels of said iron construction so as to protrude out of the side wall by their length enough to support one mounting stand situated perfectly out of the operating area.

10. The automatic cutting machine according to claim 9, wherein said opening respectively has its lower portion occupied by the bench and its upper portion through which the mounting stand moves, said upper portion is adapted to be perfectly closed by a closing means non-transmissive to the ray flux when the portion isn't used by the mounting stand.

11. The automatic cutting machine according to claim 10, wherein the closing means is an elevatable door.

12. An automatic cutting machine, comprising:
an invisible cutting laser beam generator;
a focusing head for directing the cutting laser beam toward a workpiece in such a way as to be movable in three dimensions and to be pivotable along planes horizontal and normal to a major workpiece surface;
a visible noncutting laser beam generator adapted to transmit a second tracing laser beam through the focusing head in coaxial positional relationship to the cutting laser-beam;
means for manually tracing a prototype with the noncutting laser beam;
means for storing information relating to parameters associated with the tracing of the prototype; and
means for using the stored parameters to automatically control the cutting laser beam to cut a workpiece.

13. A method of cutting with a laser device, comprising:
providing a framed cutting area having a first laser generator adapted to be directed through a focussing head toward a workpiece in such a way as to be movable in three directions and pivotable along planes horizontal and normal to a major workpiece surface and a training means comprising a second laser generator directed thereinto wherein said second laser is adapted to transmit a second laser beam through the head in coaxial positional relationship to the first laser;
placing a model within the framed cutting area;
training the training means along the path desired to be cut;
inputting information relating to the parameters used to train the training means into a control means;
replacing the model with a workpiece to be cut; and
cutting the workpiece with the laser generator using the information relating to the parameters inputted into the control means.

14. The method according to claim 13, wherein the step of cutting the workpiece with the first laser generator includes manipulating mirrors guiding the laser beam with servomotors.

* * * * *